Aug. 30, 1966  J. L. RANDOLPH  3,270,108
METHOD FOR MAKING BOWLING BALLS
Filed July 5, 1962  2 Sheets-Sheet 1
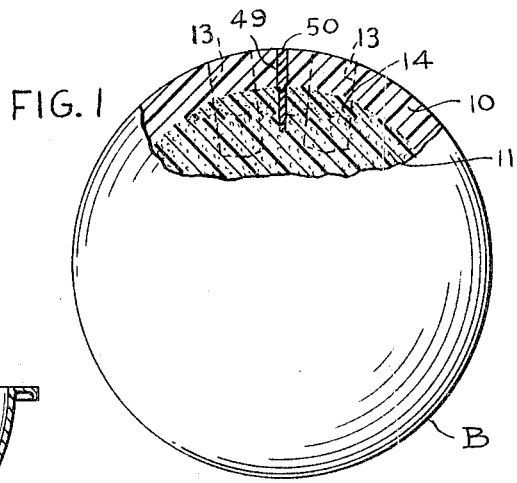
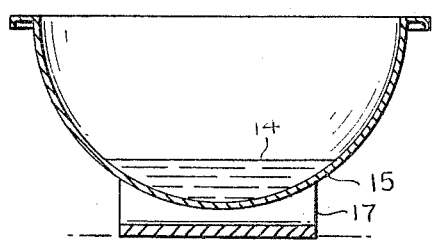
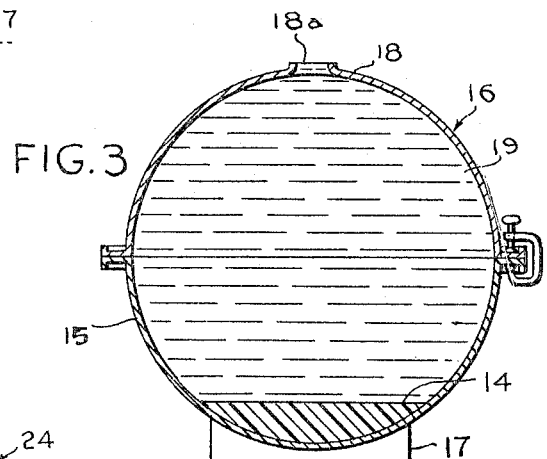
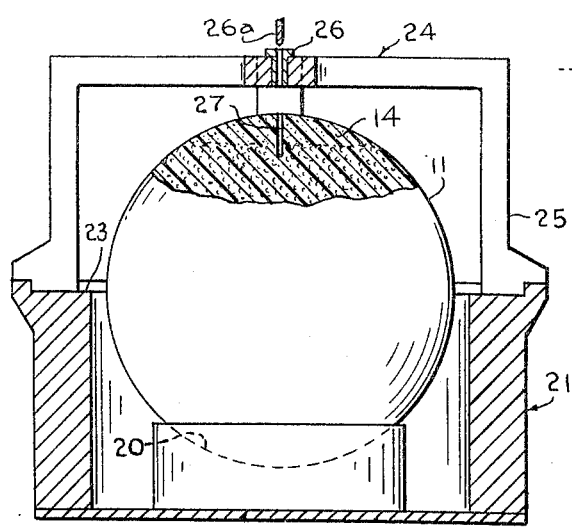
*INVENTOR.*
John L. Randolph
BY William Cleland
Attorney Aug. 30, 1966  J. L. RANDOLPH  3,270,108

METHOD FOR MAKING BOWLING BALLS

Filed July 5, 1962  2 Sheets-Sheet 2

INVENTOR.
John L. Randolph
BY William Cleland
Attorney

United States Patent Office 3,270,108
Patented August 30, 1966

3,270,108
METHOD FOR MAKING BOWLING BALLS
John L. Randolph, 1728 Liberty Drive, Akron, Ohio
Filed July 5, 1962, Ser. No. 207,702
5 Claims. (Cl. 264—162)

This invention relates to improvements in bowling balls, and to a method for making bowling balls.

Heretofore, bowling balls generally have had a relatively thick outer shell of hard rubber or synthetic resin plastic, and an inner core of cork. The usual finger holes extending into the cork cores, however, were rough and irritating to the fingers of bowlers using the balls and often caused painful sores. Moreover, because of basic differences in the characteristics of the cork core and of the outer shell, including the fact that they were not integrally bonded to each other and that they had different coefficients of elasticity, heavy impacts applied to the balls in normal use frequently resulted in breakage, and such balls had a relatively short life expectancy. Balls having hard rubber shells and cellular hard rubber cores had similar limitations and defects, but it is of particular importance that a shell of hard rubber stock cannot be integrally vulcanized to a pre-vulcanized hard rubber core of predetermined diameter. In general, known bowling ball structures of standard diameter were limited in range at least with respect to lighter weight balls, as for use by women and children.

One object of the invention is to produce a one-piece ball, including an outer shell and an inner core integrally bonded to each other, and having high impact resistance in use, with resulting greatly increased life expectancy as compared with bowling balls generally in use in the past.

Another object of the invention is to provide a method of making high-impact resistant bowling balls by which it is possible to produce balls within a substantially wider range of lighter weights thereof than has been possible in the past.

Still another object of the invention is to provide an economical method of making high-impact resistant bowling balls, which makes possible the use of light-weight molding or forming equipment, and eliminates the necessity for heavy, pressure restraining molds, and which in addition does not necessarily require the balls to be formed in the presence of heat from an external source.

A still further object of the invention is to provide a method and apparatus of producing balls of synthetic resin material, by which is eliminated the production of defective or imperfect balls caused by air bubble movement in the outer shells when they are being cured or polymerized in the ball molds.

Another object of the invention is to provide improved means by which the cores of the balls may be easily mounted in perfectly centered positions in the ball molds, whereby the outer shells of the balls will be of uniform thickness, and by which accurate means is provided for positively incorporating the usual finger-hole locating marks with respect to counterbalancing means in the balls.

Another object of the invention is to provide bowling balls in which smooth-surfaced, non-irritating finger holes may be drilled, and by which smooth finger release of the balls in use for bowling is made possible.

These and other objects of the invention will be manifest from the following brief description and the accompanying drawings.

Of the accompanying drawings:

FIGURE 1 is a front elevation, partly broken away and in section, of a finished bowling ball embodying the features of the invention.

FIGURES 2 to 7 illustrate the steps in the process for producing the bowling ball shown in FIGURE 1.

Figure 5:
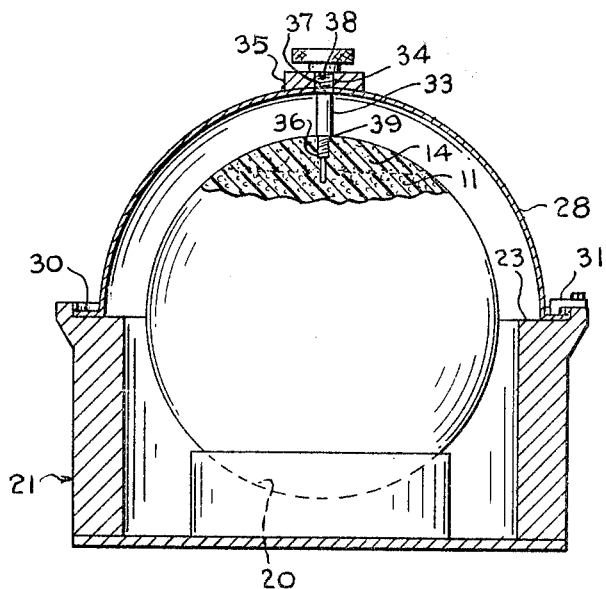

Referring to FIGURE 1 of the drawings, there is illustrated a finished bowling ball B produced by the method of the invention, the same including a spherical outer shell 10 of hard, high impact-resistent, synthetic resin material, such as polyester, and a spherical core 11 of the same or a different synthetic resin, integrally bonded to the shell 10 into a one-piece ball, in a manner to be described later. That is, the shell and the core both may be of polyester material having the same or similar characteristics as to hardness, density, resiliency, etc., or the core may be of lesser density for lighter weight. For bowling balls of from nine to fourteen pound weights the core may be made of either phenolic micro-balloons and polyester resin, or urea micro-balloons and polyester resin. Both kinds of micro-balloons in original state are very small, hollow particles of dust-like consistency. In the finished balls these micro-balloon particles remain hollow and as a consequence such balls are of corresponding light weight. For increasing the weight of the balls within the range of from nine to fourteen pounds the proportions of polyester with respect to the micro-balloons is increased. For balls within a heavier range up to sixteen pounds, for example, the phenolic core may have a filler of baryta clay (barium sulphate) in place of the micro-balloons.

To compensate for weight lost by drilling the finger holes 13, 13 in the finished ball (see FIGURE 1) a counter-balancing segment 14 of the core may be of polyester, loaded with baryta clay in requisitely varying degrees. The segment 14 will be integrally bonded to both the core 11 and the shell 10, in a one-piece structure, as before.

For producing a high-impact resistent, one-piece bowling ball of unusually light weight, such as a standard sized ball weighing as little as nine pounds, for example, the process steps may be as follows:

(a) A predetermined quantity of liquid thermosetting synthetic resin, such as polyester, is mixed with baryta clay and an initiator alone or with a promoter, such as a small quantity of MEK. peroxide (methyl ethyl ketone peroxide) and cobalt, or of cumen-hydroperoxide and cobalt. The prepared liquid mixture is poured into the bottom half 15 of a two part sectional core mold mounted on a support 17, as shown in FIGURE 2. The poured mixture starts to harden at once.

(b) The top half 18 of the core mold 16 is then firmly clamped to the bottom half 15 as shown in FIGURE 3, and a requisite quantity of a mixture of phenolic resin-micro-balloons (produced by Union Carbide Plastics Company), polyester (liquid) and an initiator alone or with a promoter, is poured through a relatively small opening 18a in the top of core mold section 18, to fill the mold 16, as indicated at 19 in FIGURE 3. The poured mixture 19 polymerizes into a hard sphere 11 in about six hours at room temperature, but this process may be speeded up by varying the amounts of promoters and initiators, and/or by exposing the mold to external heat.

In place of phenolic "micro-balloons," urea micro-balloons (produced by Union Carbide Plastics Company) may be used. In any event the resultant spherical core 11, with segment 14 integrally bonded thereto, will be considerably lighter in weight than a core made entirely of polyester or equivalent thermosetting synthetic resin material. The weight of the core may be varyingly increased, however, by increasing the proportions of polyester with respect to the phenolic, and in the case of fourteen and one-half to sixteen pound bowling balls, for example, a filler of baryta clay may be used in place of the "micro-balloon" material.

(c) Now, the polymerized core 11, which is purposely made oversized, is removed from the core mold 17, and machined or abraded down to a perfect sphere of from 7 inches to 7¾ inches in diameter, as required.

(d) As shown in FIGURE 4, the reduced core 11 of step C is now self-centeringly seated in a core seat 20 of a drill fixture 21 to have a recessed annular seat portion 23 in a plane through the center of the core. A spider 24 has downturned portions 25 for seating in centered mating relationship with the seat portion 23, to center a drill bushing 26 of the spider above the upwardly presented central portion of core segment 14, and to be in axial alignment with the center of the core. The centered bushing is then utilized to guide a rotary drill 26a for drilling a small bore 27 through the segment 14 and partly into the core body.

(e) After drilling bore 27 in the core, the spider 24 is removed from fixture 21, and a hemi-spherical bottom half 28 of a thin-walled two-part mold is substituted therefor, as shown in FIGURE 5, wherein said mold half is in inverted condition and has an annular channel-shaped flange 30 complementally seated in the seat portion 23. Mold half 28 may be firmly clamped in seat portion 23 by suitable clamping means 31, engaging the flange 30. With the mold half 28 firmly centered with respect to core 20, on fixture 21, to define a concentric space between the core and the mold half and with the core segment 14 still centered at the upper portion of the ball, a headed supporting pin 33 is inserted through threaded aperture 34 in a boss 35 on mold half 28, until a threaded extension 36 threads itself into the bore 27 in the hard segment 14. At the same time a threaded portion 37, of greater diameter than extension 36, is threaded into the threaded aperture 34 in boss 35, until shoulders 38 and 39 on the head of the pin 33 and on the inner end of the pin, respectively, engage the outer face of the boss 35 and the core segment 14. Thus, as shown in FIGURE 5, the pin 33 will be threadedly affixed on the mold half 28 to support the core 11 in accurately centered position on the mold half after removal thereof from the fixture 21.

Figure 6:
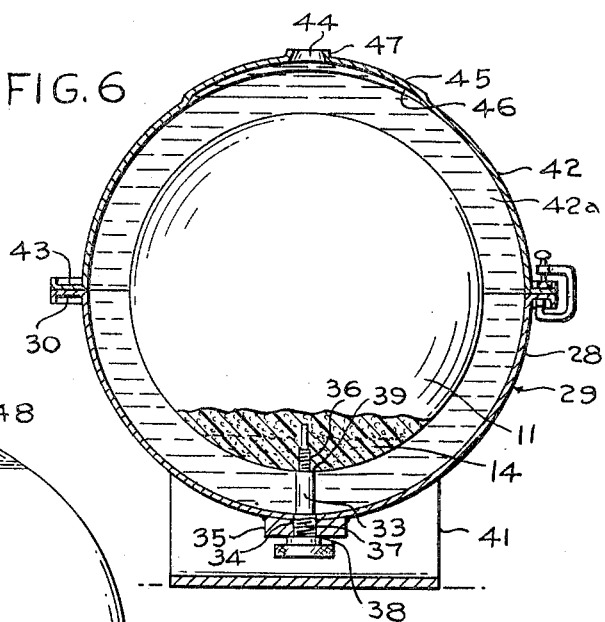

(f) After removal from fixture 21, the lower mold half with core 11 fixedly centered therein is firmly mounted on a suitable support 41 to have the flange portion 30 presented uppermost. A hemi-spherical upper half 42 of the mold 29 is mounted in mating relation on mold half 28, and an annular flange 43 thereon is suitably clamped to flange portion 30, as shown in FIGURE 6, thereby to provide a closed annular space completely around the core, except for a relatively small venting and pouring hole 44 in the upper wall portion 45 of upper mold half 42. Now a liquid mixture of polyester and an initiator, a promoter, and suitable coloring material is poured through the pouring hole 44 to fill the space 42a around the core. In this step an epoxy or other thermosetting synthetic resin may be used instead of polyester if desired. The poured mixture will polymerize into a high impact resistant shell 11 in about six to twelve hours at room temperature, and said polymerized shell will be integrally bonded to the core body 10 and to the weight compensating segment 14 in a one-piece ball. Here again the polymerizing or curing time may be speeded up by varying the initiators and promoters used, and/or by polymerizing the shell in the presence of controlled external heat.

In this step of the process, air bubbles may be present in the mixture, and these will migrate toward the vent aperture 44. During polymerization, therefore, this air will escape, and eventually the material at the top portion of the shell would settle and leave a flattened spot, which might also be porous or pockmarked. This would either cause the ball to be rejected or require the shell to be made larger to allow for more machining in a subsequent step of the process, and this in turn would require at least the shell mold to be made larger and increase costs materially.

To obviate such damage due to migrating air bubbles the upper portion 45 of the mold wall may be outwardly indented to define a correspondingly shaped recess 46 which is outwardly offset with respect to the inner shell-forming surface of the upper mold half 42. The pouring aperture 44 is shown as being defined by an outwardly flared lip 47 in the indented portion 45. The recess 46 is shaped and proportioned so that when all air has vented during polymerization of the shell material, there will still be a shallow rounded, bump 48 of excess material on the shell as shown in FIGURE 7, which illustrates the unfinished ball upon removal from mold 29, accomplished after first removing the supporting pin 33 from the mold and the ball.

Figure 7:
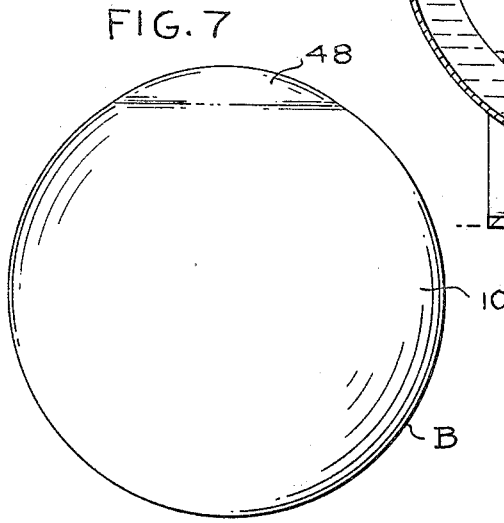

(g) After the bump 48 is ground off the ball shown in FIGURE 7, to conform to the molded spherical shape of the same, the ball is placed in a centerless grinder or in a ball machining lathe to reduce it to a perfect sphere of standard diameter, namely 8½ inches, as shown in FIGURE 1.

(h) The machined ball B is now placed in a ball buffing or polishing machine, of known type, to provide the ball surface with a smooth, glossy finish. Before machining, however, the hole 49, left open by removal of pin 33, is plugged with a filler of red pigmented thermosetting synthetic resin, such as polyester or epoxy resins, indicated at 50 in FIGURE 1, to serve as the usual fixed mark, which is subsequently used to mark centers on the ball surface for drilling spaced finger holes 13, 13, indicated in dotted lines in FIGURE 1, to suit an individual who subsequently acquires ownership of the ball.

By the method described, synthetic resin bowling balls may be economically produced within a wide range of weight requirements including balls of standard size weighing from nine pounds to sixteen pounds, in light-weight molds, without rotation of the molds, and without necessarily using external heat for any of the several polymerizing steps.

Finger holes 13, 13 drilled in the finished balls, produced as described above, will have smooth, non-irritating surfaces, and accordingly the drilled balls of the invention will have smooth finger-releasing qualities which will improve the ball users scoring abilities. One-piece balls of the invention are more resilient than bowling balls heretofore available, and they are many times stronger than hard rubber bowling balls, for example.

Modifications of the invention may be resorted to without departing from the spirit thereof, or the scope of the appended claims.

What is claimed is:

1. A method of making a bowling ball comprising the steps of:
(a) placing a pre-determined quantity of self-polymerizing synthetic resin in the bottom of a hollow spherical core mold to form a hard segment of a sphere;
(b) filling the remainder of said hollow spherical core mold with a fluid mixture of a synthetic resin and a density control medium, at least a substantial portion of which is composed of hollow synthetic resin particles;
(c) causing said mixture to polymerize and integrally bond to said segment to form a hardened substantially spherical core in said core mold;
(d) removably affixing said core in a hollow shell mold having a spherical article-forming surface substantially concentrically spaced with respect to said core to define a shell-forming space, said shell mold having a top-filling opening;
(e) filling said shell-forming space with synthetic resin through said filling opening;
(f) said shell mold being proportioned to provide a slight excess of said synthetic resin shell material not protruding substantially outwardly beyond said spherical article-forming surface and being of broad lateral extent greater than said filling opening to provide a slight bump on the upper portion of the same sufficient to compensate for settling of said shell material tending to be caused in the area of said filling opening by upward migration and venting of air bubbles through said shell material in said area during polymerization of said shell material;
(g) causing said shell material to polymerize and integrally bond to said core;
(h) removing the resultant ball from said shell mold; and
(i) reducing said ball to pre-determined finished spherical size.

2. A method as set forth in claim 1 wherein said density control medium includes Baryta clay.

3. A method as set forth in claim 1 wherein said hollow synthetic resin particles of said core are selected from the group consisting of phenolic and urea micro-balloons and said fluid mixture includes an initiator.

4. A method as set forth in claim 1 wherein said hollow synthetic resin particles of said core are selected from the group consisting of phenolic and urea micro-balloons and said fluid mixture includes an initiator and a polyester.

5. A method as in claim 1, wherein said core is supported within said shell mold by a pin removably affixed to said core and said shell mold to have a portion of the pin extended radially through said shell-forming space, a hole being provided in the formed shell by said pin portion, a filler of visibly distinguishable, self-hardening material being provided in said hole after removal of said pin, the visible portion of said filler after reduction to finished spherical size thereby serving as a finger-hole locating mark.

References Cited by the Examiner
UNITED STATES PATENTS

| | | | |
|---|---|---|---|
| 721,462 | 2/1903 | Richard | 264—275 |
| 1,930,167 | 10/1933 | Goodwin. | |
| 2,063,315 | 12/1936 | Kuettel | 264—308 |
| 2,076,412 | 4/1937 | Oldham. | |
| 2,291,738 | 8/1942 | Luth et al. | 273—63 |
| 2,414,672 | 1/1947 | Sauer | 273—63 |
| 2,787,024 | 4/1957 | Smith | 264—161 |
| 2,797,201 | 6/1957 | Veatch et al. | 264—53 |
| 2,856,679 | 10/1958 | Burkhardt. | |

FOREIGN PATENTS 871,704  6/1961  Great Britain.

ROBERT F. WHITE, *Primary Examiner.*

JAMES W. LOVE, *Examiner.*

W. R. BROWNE, T. J. CARVIS,
*Assistant Examiners.*